No. 880,371. PATENTED FEB. 25, 1908.
R. J. ELLEDGE.
METHOD OF MAKING LEATHER TIRES.
APPLICATION FILED MAY 2, 1907.
2 SHEETS—SHEET 1.
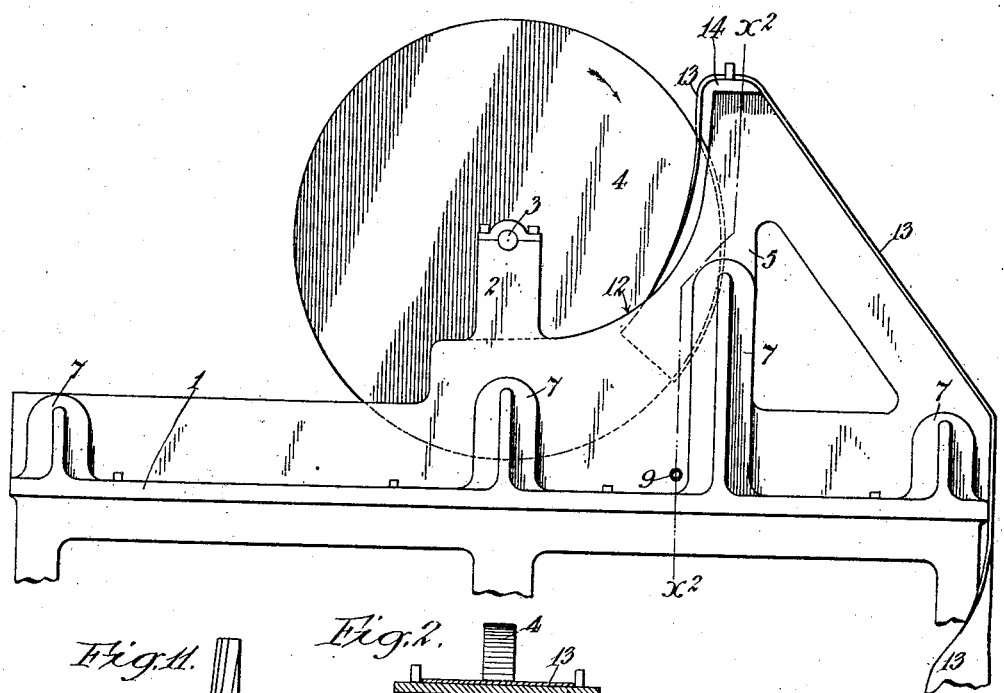
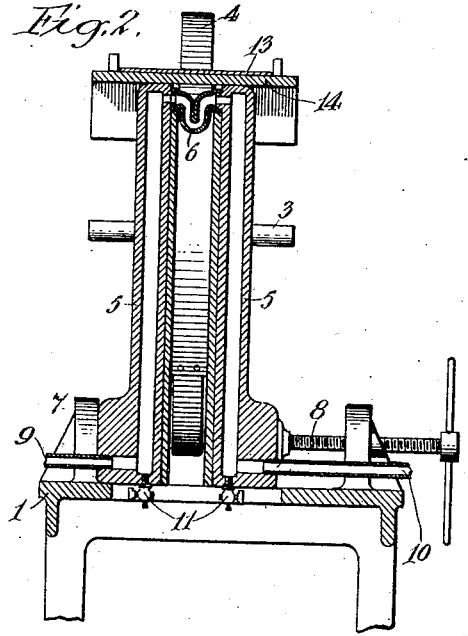
Witnesses:
Louis W. Gratz.
Frank L. A. Graham.
Inventor.
Raymond J. Elledge.
by
Townsend, Gauntackley, Haight
His attys.

No. 880,371. PATENTED FEB. 25, 1908.
R. J. ELLEDGE.
METHOD OF MAKING LEATHER TIRES.
APPLICATION FILED MAY 2, 1907.
2 SHEETS—SHEET 2.
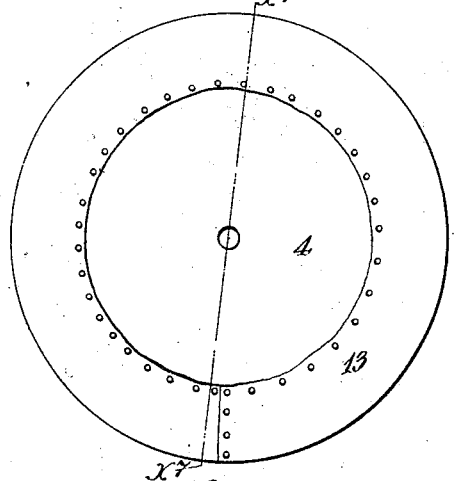
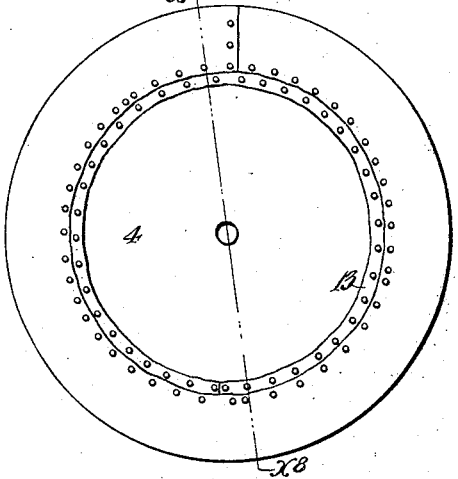
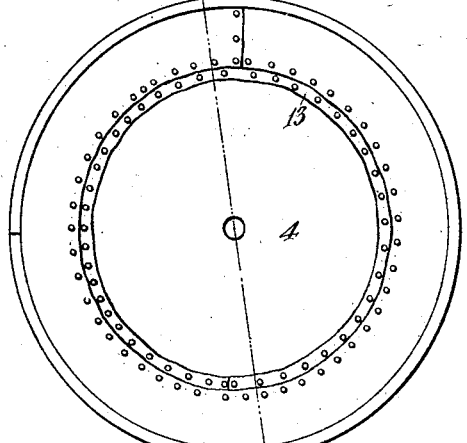
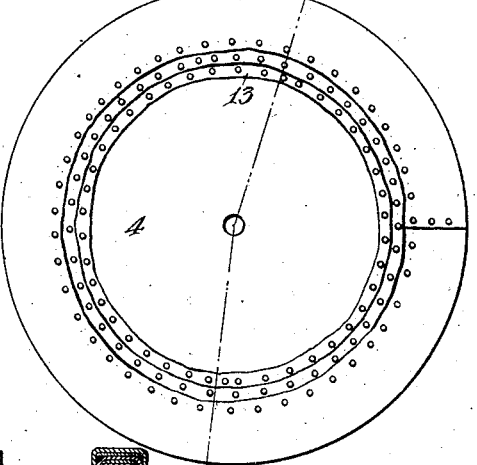
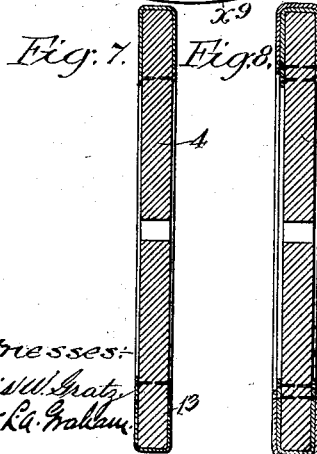
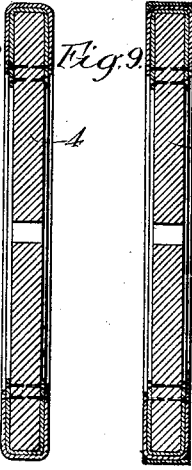
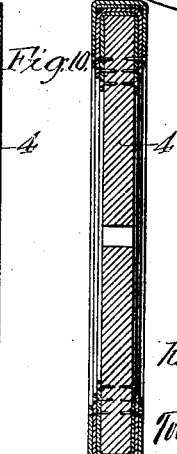
Witnesses:
Inventor
Raymond J. Elledge.
by
Townsend & Hackley & Knight
His Attys.

UNITED STATES PATENT OFFICE.

RAYMOND J. ELLEDGE, OF LOS ANGELES, CALIFORNIA, ASSIGNOR TO ANTI OAK LEATHER COMPANY, OF LOS ANGELES, CALIFORNIA, A CORPORATION OF CALIFORNIA.

METHOD OF MAKING LEATHER TIRES.

No. 880,371.  Specification of Letters Patent.  Patented Feb. 25, 1908.

Application filed May 2, 1907. Serial No. 371,547.

*To all whom it may concern:*

Be it known that I, RAYMOND J. ELLEDGE, a citizen of the United States, residing at Los Angeles, in the county of Los Angeles and State of California, have invented a new and useful Method of Making Leather Tires, of which the following is a specification.

This invention relates to methods of making leather tires, a tire, for example, such as shown and described in a former application of mine, filed February 26, 1907, Serial Number 359,514, and the objects of the present invention are to provide a simple and expeditious method of constructing leather tires at a minimum expense and produce a tire that will maintain its shape permanently.

The devices employed in carrying out the method may be variously constructed, but I have shown in the drawings one form of construction which will facilitate an understanding of the method, and referring to the drawings:—Figure 1 is a side view showing the first strip of leather in the process of being formed. Fig. 2 is a cross section on line $x^2$—$x^2$ Fig. 1. Fig. 3 is a view showing the appearance of the tire after the first step. Fig. 4 shows the appearance of the tire after the second step. Fig. 5 shows the appearance after the next step. Fig. 6 shows the appearance after the next step. Fig. 7 is a cross section on line $x^7$—$x^7$ Fig. 3. Fig. 8 is a cross section on line $x^8$—$x^8$ Fig. 4. Fig. 9 is a cross section on line $x^9$—$x^9$ Fig. 5. Fig. 10 is a cross section on line $x^{10}$—$x^{10}$ Fig. 6. Fig. 11 is a side elevation on a reduced scale of one of the ironing faces and illustrates the corrugations thereon.

Briefly, the process consists of applying the leather while damp and in a pliable condition, in successive strips to a form, and simultaneously applying pressure and heat to the strip to fit it to the form. After one strip has been thus applied to the form its edges are tacked to the form and another strip is ironed on over the first strip and the edges of the second strip are then tacked to the form. Then a third strip is ironed on over the succeeding strip, and in this manner as many strips may be applied and shaped to the form as desired, the number of strips thus applied obviously depending on the desired thickness of the tire which is to be constructed. After the several strips have set, and become permanently fitted to each other, the tacks are removed, and by springing the built up piece slightly it may be removed from the form as one piece, the ends of the piece may then be fastened together by cement or in any desired manner and the rim-engaging portions may be sewed or otherwise affixed to the edges of the piece to complete the tire.

The main features of the present invention relate to the method of building up the tires from several leather sections and securing the desired permanent shape.

Referring to Fig. 1, 1 designates a table having standards 2 which support a shaft 3 upon which the form comprising a disk 4 is mounted. A pair of vertical arms 5 project up from the table 1, each arm being hollow as shown, and the two arms at their upper ends communicate with each other by a flexible pipe 6 which permits the two arms to be adjusted toward or away from each other without breaking communication. Abutments 7 on the table 1 support one of the arms 5 against lateral movement in one direction, while the other arm 5 may be held up in working position by clamp screws 8. Pipes 9 and 10 communicate respectively with the lower portions of the arms 5 and permit of maintaining a circulation of hot steam or other heating medium through the hollow arms; steam being admitted, for example, through pipe 9, passing up to the top of the adjacent hollow arm 5, thence through pipe 6 into the opposite hollow arm, thence down and out through pipe 10. Drain-cocks 11 are located in the lower ends of the arms for draining off condensed steam which falls to the bottom of the arms.

Each arm is formed with a curved upper face 12 and is broadened at its base, the arm being in side elevation substantially L-shaped as shown in Fig. 1. The curved faces 12 are not concentric with the form 4 as shown, but curve inwardly from the perimeter of the form. The inner faces of the hollow arms 5 constitute what may be termed ironing faces, which press against the leather strip in operation, and each ironing face is provided with slight corrugations as indicated in Fig. 11, and these corrugations are also concentric to the form 4.

In forming the tire a strip of damp leather 13 is tacked at its end to the form 4, the strip 13 being run over a guide 14 at the upper ends of the arms 5. The form is then turned slowly in the direction of the arrow and the strip of leather 13 is thus gradually drawn around with the form and is pressed by the ironing faces of the hollow arms into close contact with the form. The hollow arms are so adjusted that a very great pressure is produced on the leather which, combined with the heat, stretches the leather and irons it into shape so that it fits the edge of the form. This pressure is so great that considerable power is required to turn the form 4. The method is continuous, the strip being gradually fed to the irons and formed in place thereby over the edge of the form and stretched thereon under great pressure and heat, the heat acting in greater degree on the outer surface of the leather strip than on the inner, as the strip must be stretched more on its outer surface than on its inner surface. After the first strip has thus been stretched on the form its edges are tacked as indicated in Fig. 3, then another strip is formed over the first strip in the same manner and the second strip tacked in place, then a third strip is formed over the second strip in the same manner and tacked in place. The strips thus applied to the form have practically all of their stretch removed and when set are very hard and resistant. After the successive layers have thus been formed the tacks are removed and the ends of the ring are united by cementing or otherwise, and other strips of leather are laced or sewed to the edges to form the rim-engaging portion of the tire. The comparatively sharp corners of the tire become considerably blunt after its removal from the form so that the cross sectional contour is rounding. During the ironing process the corrugations on the ironing faces greatly facilitate the stretching of the leather, as they grip the surface of the leather and tend to increase the drag, and it is possible to stretch the leather to any desired degree. The form 4 may be turned around by any suitable machinery. It should be turned rather slowly to enable the heat to effectively act upon the leather in the process of forming and stretching. The clamping screws 8 may be relaxed a trifle after each successive strip has been applied to give room for the succeeding strip.

A form of given size is suitable for shaping tires of various diameters, as within certain limits the diameter of the tire is obtained by trimming the inner edges of the strips and contracting the ring of strips to the required diameter to fit the rim of the wheel, the ends of the ring of strips being cemented after the ring has been contracted to the desired diameter. For producing tires having a diameter outside of these limits forms 4 are used of relative diameters corresponding to the diameter of tires to be formed.

What I claim is:—

1. The process of making leather tires which consists of applying leather strips successively over the edge of a circular form and ironing each strip as it is applied over the edge of the form.

2. The process of making leather tires which consists of drawing a moist strip of leather on a circular form between two hot ironing plates and subsequently applying successive strips over the first strip, then removing the ring of strips from the form and uniting the ends of the ring and finishing the tire.

3. The method of making leather tires which consists of applying successive strips of damp leather to the edge of a circular form with great pressure, simultaneously stretching the leather as it is applied to the form and at the same time imparting greater heat to the outer portion of the strip than to its inner portion whereby the outer portion of each strip is stretched more than the inner portion, and subsequently finishing the tire.

In testimony whereof, I have hereunto set my hand at Los Angeles, California, this 24th day of April 1907.

RAYMOND J. ELLEDGE.

In presence of—
GEORGE T. HACHLEY,
FRANK L. A. GRAHAM.